(12) United States Patent
Takahashi

(10) Patent No.: US 10,113,090 B2
(45) Date of Patent: Oct. 30, 2018

(54) ADHESIVE COMPOSITION

(71) Applicant: HITACHI CHEMICAL COMPANY, LTD., Tokyo (JP)

(72) Inventor: Yuzuru Takahashi, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/500,289

(22) PCT Filed: Nov. 26, 2015

(86) PCT No.: PCT/JP2015/083265
§ 371 (c)(1),
(2) Date: Jan. 30, 2017

(87) PCT Pub. No.: WO2017/061061
PCT Pub. Date: Apr. 13, 2017

(65) Prior Publication Data
US 2018/0208808 A1    Jul. 26, 2018

(30) Foreign Application Priority Data
Oct. 5, 2015   (JP) .................................. 2015-197672

(51) Int. Cl.
*C09J 147/00* (2006.01)
*C09J 161/06* (2006.01)

(52) U.S. Cl.
CPC ........... *C09J 147/00* (2013.01); *C09J 161/06* (2013.01)

(58) Field of Classification Search
CPC ...................................................... C09J 147/00
USPC ............................................................ 524/81
See application file for complete search history.

(56) References Cited

FOREIGN PATENT DOCUMENTS

| CN | 1345250 A | 4/2002 |
|---|---|---|
| EP | 0331410 A1 | 9/1989 |
| JP | H02-196878 A | 8/1990 |
| JP | H03-20381 A | 1/1991 |
| JP | H05-140522 A | 6/1993 |
| JP | H08-269417 A | 10/1996 |
| JP | H11-181386 A | 7/1999 |
| JP | H11-323289 A | 11/1999 |
| JP | 2001-523285 A | 11/2001 |
| JP | 2002-535453 A | 10/2002 |
| JP | 2004-284575 A | 10/2004 |
| JP | 2005-290339 A | 10/2005 |
| JP | 2013-216724 A | 10/2013 |
| WO | 98/049249 A1 | 11/1998 |
| WO | 00/44412 A1 | 8/2000 |

OTHER PUBLICATIONS

International Search Report of Appln. No. PCT/JP2015/083265 dated Feb. 9, 2016.

*Primary Examiner* — Deve E Valdez
(74) *Attorney, Agent, or Firm* — Fitch, Even, Tabin & Flannery, LLP

(57) ABSTRACT

The present invention relates to an adhesive composition comprising: 15 to 25 parts by weight of a 1-butene homopolymer; 12 to 22 parts by weight of an α-olefin copolymer having a melting point of 90° C. or higher; 30 to 50 parts by weight of a tackifier resin having a softening point of 125° C. or higher; 6 to 22 parts by weight of a polypropylene-based wax; and 4 to 20 parts by weight of a liquid hydrocarbon.

8 Claims, No Drawings

ADHESIVE COMPOSITION

TECHNICAL FIELD

The present invention relates to a solvent-free non-reactive adhesive composition for automotive interior, which adhesive composition is used when bonding a molded product made of polyolefin or the like and a covering material such as a fabric lined with a polyurethane foam, and provides a long open time and excellent bonding properties by single spread.

BACKGROUND ART

A door, an instrument panel, a ceiling material, a rear tray, a pillar, and the like, which are automotive interior materials, generally comprise a molded product and a covering material. As the molded product, a polyolefin molded product is mainly used. On the other hand, a covering material made of a polyurethane foam, a fabric lined with a polyurethane foam, polyolefin, or the like is used as the covering material. The molded product and the covering material are bonded by a pressure bonding method, a vacuum forming method or the like using an adhesive.

A solvent-based one-pack reactive adhesive is used as the adhesive for automotive interior up to date particularly in order to secure creep resistant properties on heating. For example, in Patent Literature 1, a chloroprene rubber-based adhesive comprising modified polychloroprene, a tackifier, and an organic solvent is disclosed. In Patent Literature 2, an adhesive which contains a styrene block copolymer and liquid rubber in combination and do not contain halogen such as chlorine is disclosed. However, the level of environmental requirements is increased, and therefore a switch from the solvent, one-pack, reactive adhesive to a solvent-free adhesive is desired.

Examples of the alternative candidate to render the solvent-based adhesive for automotive interior free from solvents include a hot-melt adhesive. Among the hot-melt adhesives, a reactive hot-melt adhesive advantageously has excellent heat resistance. However, disadvantageously, it is difficult for the reactive hot-melt adhesive to keep a balance between a curing time and stability during application work and storage. In light of bonding properties when an adherend is a polyolefin molded product, a reactive polyolefin adhesive obtained by silane-modifying polyolefin, such as a composition disclosed in Patent Literature 3 is the candidate. However, the reactive polyolefin adhesive emits an organic solvent into an atmosphere by hydrolysis reaction during curing, and therefore there is a fear that the reactive polyolefin adhesive might lack in aptitude as an environment-friendly adhesive.

Among the hot-melt adhesives other than the reactive hot-melt adhesive, a non-reactive, hot-melt adhesive provides no fear that an organic solvent derived from raw materials and a hydrolysis reaction volatilizes from it, and the non-reactive, hot-melt adhesive is thus very greatly expected as the environment-responsive adhesive, and promising. The non-reactive hot-melt adhesive requires no curing time, and has high stability during application work and storage, which is convenient for users. As for a non-reactive adhesive having excellent bonding properties to polyolefin molded products, Patent Literature 4, for example, discloses a use of a hot-melt adhesive in which the surface temperature of a hot-melt adhesive when bonding is set to be equal to or higher than the temperature of the atmosphere when measuring a creep resistant on heating in order to obtain creep resistant properties on heating.

CITATION LIST

Patent Literature

Patent Literature 1: JP H5-140522 A
Patent Literature 2: JP 2005-290339 A
Patent Literature 3: JP 2013-216724 A
Patent Literature 4: JP 2004-284575 A

SUMMARY OF INVENTION

Technical Problem

However, the hot-melt adhesive described in Patent Literature 4 disadvantageously has an extremely short open time. Here, the "open time" is a time from separating the hot-melt adhesive melted by heating from a heat source to pressure-bonding adherends for bonding them together, i.e., a working life. In light of the workability in bonding work, an adhesive having a long open time is easier to use. Furthermore, in the case where a fabric material as a covering is pasted immediately after the hot-melt adhesive is melted by heating, the fabric becomes a heat-pressed state because the melted adhesive has a high temperature, and bristle falling thus occurs on the surface of the fabric. The bristle falling is a so-called poor appearance, such as streak or color unevenness, caused by the deformation or transformation of bristle. Therefore, also in view of design properties, the open time is preferably long.

When a polyolefin molded product and a fabric (covering material) lined with a polyurethane foam are bonded by a pressure bonding method involving single spread of applying an conventionally known non-reactive, hot-melt adhesive to only a covering material side having heat dissipation properties with respect to a molded product, it is necessary to set the open time to 5 seconds or less. In particular, creep resistant properties on heating may not be obtained. If the hot-melt adhesive is softened in order to extend the open time, a cohesive force is decreased, so that creep resistant properties on heating cannot be obtained. Therefore, it is difficult to achieve both the creep resistant properties on heating of the hot-melt adhesive and the extension of the open time.

Solution to Problem

In order to solve the problems, the present invention provides (1) an adhesive composition comprising: 15 to 25 parts by weight of a 1-butene homopolymer; 12 to 22 parts by weight of an α-olefin copolymer having a melting point of 90° C. or higher; 30 to 50 parts by weight of a tackifier resin having a softening point of 125° C. or higher; 6 to 22 parts by weight of a polypropylene-based wax; and 4 to 20 parts by weight of a liquid hydrocarbon.

The present invention also provides (2) the adhesive composition according to (1), wherein the α-olefin copolymer is a 1-butene/α-olefin copolymer or a propylene/α-olefin copolymer.

Furthermore, the present invention provides (3) the adhesive composition according to (1) or (2), wherein the tackifier resin is at least one selected from a terpene-phenol resin or a hydrogenerated resin.

(4) The adhesive composition according to any one of (1) to (3), wherein a peeling length is 10 mm or less when performing a test for creep resistant on heating under the condition of a load of 100 g for 24 hours in an atmosphere of 80° C. after bonding adherends via the adhesive composition with an open time of 45 seconds is also in the scope of the present invention.

Advantageous Effects of Invention

The adhesive composition of the present invention can exhibit excellent creep resistant properties on heating even when bonding adherends with an open time of 45 seconds according to the constitution. That is, the adhesive composition of the present invention is a solvent-free adhesive in consideration of environmental problems, and can be suitably used as an adhesive for automotive interior exhibiting excellent bonding properties to a polyolefin molded product even after an open time of 45 seconds regardless of being a non-reactive adhesive composition.

DESCRIPTION OF EMBODIMENTS

Hereinafter, an embodiment of the present invention will be described in detail. However, the present invention is in no way limited to the following embodiment.

An adhesive composition of the present embodiment contains a 1-butene homopolymer, an α-olefin copolymer having a melting point of 90° C. or higher, a tackifier resin having a softening point of 125° C. or higher, a polypropylene-based wax, and a liquid hydrocarbon as main ingredients. In the adhesive composition, the content of the 1-butene homopolymer is 15 to 25 parts by weight; the content of the α-olefin copolymer having a melting point of 90° C. or higher is 12 to 22 parts by weight; the content of the tackifier resin having a softening point of 125° C. or higher is 30 to 50 parts by weight; the content of the polypropylene-based wax is 6 to 22 parts by weight; and the content of the liquid hydrocarbon is 4 to 20 parts by weight.

The 1-butene homopolymer according to the present embodiment has crystallinity exhibiting a melting point of 120° C. or higher, which can impart heat resistance to the adhesive composition. The MFR (190° C., load: 2.16 kg) of the 1-butene homopolymer is preferably 100 g/10 min or more but not particularly limited thereto since it is different depending on various intended physical properties. Herein, the MFR means a melt flow rate. As the commercialized product of the 1-butene homopolymer, trade name "PB0800M" manufactured by LyondellBasell Industries, or the like can be used. The melting point of this material is a differential scanning calorimetry (DSC) value after 10 days from the solidification of the material from the molten state.

The amount of the 1-butene homopolymer blended is preferably 15 to 25 parts by weight, and more preferably 17 to 23 parts by weight. If the amount of the 1-butene homopolymer blended is less than 15 parts by weight, sufficient heat resistance is not obtained, and if the amount blended is more than 25 parts by weight, an adhesive coated layer becomes hard, causing a decrease in adhesion.

The tackifier resin can impart tackiness during melting to the α-olefin copolymer having a melting point of 90° C. or higher according to the present embodiment. Since the α-olefin copolymer has a melting point higher than the temperature of the atmosphere of the measurement of a creep resistant on heating, heat resistance in the intended application is not impaired. Therefore, the α-olefin copolymer contributes to various functions such as the flexibility, adhesiveness and heat resistance of the adhesive coated layer. The melting point of this material is a differential scanning calorimetry (DSC) value after 10 days from the solidification of the material from the molten state. As the commercialized product of the α-olefin copolymer, trade names "TAFMER BL2491M", "TAFMER BL3450M", "TAFMER BL3110M", "TAFMER PN-2070", "TAFMER PN-3560", "TAFMER PN-2060", "TAFMER PN-20300", "TAFMER PN-0040" or the like manufactured by Mitsui Chemicals, Inc. can be used. These α-olefin copolymers can be used in combination of two or more.

The amount of the α-olefin copolymer having a melting point of 90° C. or higher blended is preferably 12 to 22 parts by weight, and more preferably 14 to 20 parts by weight. If the amount of the α-olefin copolymer having a melting point of 90° C. or higher blended is less than 12 parts by weight, the adhesiveness of an adhesive is decreased, which does not produce a sufficient adhesion force, and even if the amount blended is more than 22 parts by weight, the adhesiveness is decreased, which does not produce a sufficient adhesion force. The lower limit of the melting point of the α-olefin copolymer is more preferably 100° C. or higher. Furthermore, a preferable form of the α-olefin copolymer is a 1-butene/α-olefin copolymer or a propylene/α-olefin copolymer. The upper limit value of the melting point of the α-olefin copolymer is not particularly limited, and may be about 160° C.

The tackifier resin having a softening point of 125° C. or higher according to the present embodiment can be selected depending on various intended physical properties from the group consisting of, for example, a petroleum resin, a pure monomer-based petroleum resin, a hydrogenated petroleum resin, a rosin resin, a rosin ester resin, a hydrogenated rosin resin, a terpene resin, a terpene-phenol resin, an aromatic modified terpene resin, a hydrogenated terpene resin, a coumarone-indene resin, an alkyl phenol resin, and a xylene resin. In order to impart good tackiness during melting to the α-olefin copolymer, the tackifier resin is desirably a terpene-phenol resin or a hydrogenated resin (hydrogenated terpene, a hydrogenated petroleum resin or the like). As the commercialized product of the tackifier resin having a softening point of 125° C. or higher, trade names "ARKON M135", "ARKON P125" and "ARKON P140" manufactured by Arakawa Chemical Industries, Ltd., trade names "YS POLYSTAR T130", "YS POLYSTAR T145", "YS POLYSTAR T160", "YS POLYSTAR S145", "YS POLYSTAR G125", "YS POLYSTAR G150", "CLEARON P125", "CLEARON P135" and "CLEARON P150" manufactured by Yasuhara Chemical Co., Ltd., and trade names "Eastotac H-13 OR", "Eastotac H-130L", "Eastotac H-130W", "Eastotac H-142R", "Eastotac H-142W", "Regalrez1128" and "Regalrez1139" manufactured by Eastman Chemical Co. can be used, for example. These tackifier resins can be used in combination of two or more. The softening point of the tackifier resin having a softening point of 125° C. or higher is a Ring and Ball softening point. The upper limit value of the softening point of the tackifier resin is not particularly limited, and may be about 160° C.

The amount of the tackifier resin having a softening point of 125° C. or higher blended is preferably 30 to 50 parts by weight, and more preferably 35 to 45 parts by weight. If the amount of the tackifier resin having a softening point of 125° C. or higher blended is less than 30 parts by weight, sufficient adhesiveness cannot be obtained, and even if the amount blended is more than 50 parts by weight, sufficient adhesiveness cannot be obtained.

The polypropylene-based wax according to the present embodiment contributes also to the heat resistance of the adhesive composition in addition to imparting wettability to an adherend. Therefore, the polypropylene-based wax preferably has a Ring and Ball softening point of 100° C. or higher. As the commercialized product of the polypropylene-based wax, trade names "Viscol 660-P" and "Viscol 550-P" manufactured by Sanyo Chemical Industries, Ltd., can be used, for example.

The amount of the polypropylene-based wax blended is preferably 6 to 22 parts by weight, and more preferably 10 to 18 parts by weight. If the amount of the polypropylene-based wax blended is less than 6 parts by weight, sufficient heat resistance cannot be obtained, and if the amount blended is more than 22 parts by weight, the adhesive coated layer becomes hard, causing decrease in adhesion.

Being in a liquid form at normal temperature, the liquid hydrocarbon according to the present embodiment further enhances the adhesiveness provided by the tackifier resin when being melted by heating, thereby contributing to the extension of the open time of the adhesive composition. The kinetic viscosity (100° C., JIS K 2283) of the liquid hydrocarbon is preferably 50 mm$^2$/s or more, but not particularly limited thereto since it is different depending on various intended physical properties. As the commercialized product of the liquid hydrocarbon, trade names "Nissan Polybutene 200N", "Nissan Polybutene 30N", "Nissan Polybutene 10N" and "Nissan Polybutene 3N" manufactured by NOF Corporation, and trade names "LUCANT HC-2000", "LUCANT HC-600" and "LUCANT HC100" manufactured by Mitsui Chemicals, Inc. can be used, for example.

The amount of the liquid hydrocarbon blended is 4 to 20 parts by weight, and more preferably 8 to 16 parts by weight. If the amount of the liquid hydrocarbon blended is less than 4 parts by weight, the extension effect of the open time cannot be sufficiently obtained, and if the amount blended is more than 20 parts by weight, a cohesive force is decreased and sufficient heat resistance cannot be obtained.

The amount of each of the above-mentioned ingredients blended is a proportion on the basis of a total of 100 parts by weight of the 1-butene homopolymer, α-olefin copolymer having a melting point of 90° C. or higher, tackifier resin having a softening point of 125° C. or higher, polypropylene-based wax, and liquid hydrocarbon.

The adhesive composition of the present embodiment may contain additives such as an antioxidant, a stabilizer, a colorant, a compatibilizer and an antiblocking agent, if needed, in addition to the total of 100 parts by weight of the above-mentioned main ingredients.

The adhesive composition of the present embodiment is generally produced through the following processes. Specifically, after an α-olefin copolymer having a melting point of 90° C. or higher and a tackifies resin having a softening point of 125° C. or higher are melted and kneaded in a kneader set to 180° C., a 1-butene homopolymer is added thereto, followed by kneading for complete melting.

Next, a polypropylene-based wax and a liquid hydrocarbon are added thereto, and the resultant is kneaded for complete melting, to obtain a melted product. The obtained melted product is put in a mold release box or cut to a pellet or the like and solidified by cooling to produce an adhesive composition of the present embodiment. The adhesive composition of the present embodiment can be used as hot-melt adhesive.

The adhesive composition of the present embodiment can extend a time (open time) from heating it by a heat source (for example, far-infrared heater) and then separating it from the heat source to bonding adherends. The adhesive composition of the present embodiment can achieve both creep resistant properties on heating and extension of the open time. For example, a peeling length can be 10 mm or less when performing a test for creep resistant on heating under the condition of a load of 100 g for 24 hours in an atmosphere of 80° C. after bonding adherends via the adhesive composition of the present embodiment with the open time of 45 seconds from separating the heated adhesive composition from the heat source. In other words, the adhesive composition of the present embodiment results in the peeling length of 10 mm or less in the test for creep resistant on heating (load: 100 g, 80° C., 24 hours) after bonding with the open time of 45 seconds.

EXAMPLES

Next, the present invention will be described in more detail by way of Examples and Comparative Examples, but the present invention is not limited thereby.

[Production of Adhesive Composition]

Example 1

0.5 parts by weight of a hindered phenol antioxidant "Irganox 1010" (manufactured by BASF Corporation), 0.5 parts by weight of a phosphorus-based antioxidant "Irgafos 168" (manufactured by BASF Corporation), 17 parts by weight of a propylene/α-olefin copolymer "TAFMER PN-2070" (manufactured by Mitsui Chemicals, Inc., melting point: 140° C.), and 37 parts by weight of a hydrogenated terpene resin "CLEARON P150" (manufactured by Yasuhara Chemical Co., Ltd., softening point: 150° C.) were melted and kneaded for complete melting in a 2 L-volume kneader set to 180° C. so that the total amount of raw materials fed was set to 1 kg, and 20 parts by weight of a 1-butene homopolymer "PB0800M" (manufactured by LyondelBasell Industries, melting point: 124° C.) was added thereto, followed by kneading for complete melting. Next, 14 parts by weight of a polypropylene-based wax "Viscol 660-P" (manufactured by Sanyo Chemical Industries, Ltd., softening point: 145° C.) and 12 parts by weight of liquid polybutene "Nissan Polybutene 30N" (manufactured by NOF Corporation) were added thereto, followed by kneading for complete melting, and a mold release box was filled with the obtained melted product to obtain a hot-melt adhesive (1).

Example 2

0.5 parts by weight of a hindered phenol antioxidant "Irganox 1010", 0.5 parts by weight of a phosphorus-based antioxidant "Irgafos 168", 17 parts by weight of a 1-butene/α-olefin copolymer "TAFMER BL3450M" (manufactured by Mitsui Chemicals, Inc., melting point: 100° C.), and 37 parts by weight of a hydrogenated terpene resin "CLEARON P150" were melted and kneaded in a 2 L-volume kneader set to 180° C. so that the total amount of raw materials fed was set to 1 kg. After complete melting, 20 parts by weight of a 1-butene homopolymer "PB0800M" was added thereto, followed by kneading for complete melting. Next, 14 parts by weight of a polypropylene-based wax "Viscol 660-P and 12 parts by weight of liquid polybutene "Nissan Polybutene 30N" were added thereto, followed by kneading for complete melting, and a mold release box was filled with the obtained melted product to obtain a hot-melt adhesive (2).

The hot-melt adhesive (2) was obtained by changing the propylene/α-olefin copolymer "TAFMER PN-2070" in Example 1 to the 1-butene-/α-olefin copolymer "TAFMER BL3450M."

Example 3

0.5 parts by weight of a hindered phenol antioxidant "Irganox 1010", 0.5 parts by weight of a phosphorus-based antioxidant "Irgafos 168", 22 parts by weight of a propylene/α-olefin copolymer "TAFMER PN-2070", and 37 parts by weight of a hydrogenated terpene resin "CLEARON P150" were melted and kneaded in a 2 L-volume kneader set to 180° C. so that the total amount of raw materials fed was set to 1 kg. After complete melting, 15 parts by weight of a 1-butene homopolymer "PB0800M" was added thereto, followed by kneading for complete melting. Next, 14 parts by weight of a polypropylene-based wax "Viscol 660-P" and 12 parts by weight of liquid polybutene "Nissan Polybutene 30N" were added thereto, followed by kneading for complete melting, and a mold release box was filled with the obtained melted product to obtain a hot-melt adhesive (3).

The hot-melt adhesive (3) was obtained by changing 17 parts by weight of the amount of the propylene/α-olefin copolymer "TAFMER PN-2070" blended in Example 1 to 22 parts by weight, and 20 parts by weight of the amount of the 1-butene homopolymer "PB0800M" blended to 15 parts by weight.

Example 4

0.5 parts by weight of a hindered phenol antioxidant "Irganox 1010", 0.5 parts by weight of a phosphorus-based antioxidant "Irgafos 168", 12 parts by weight of a propylene/α-olefin copolymer "TAFMER PN-2070", and 37 parts by weight of a hydrogenated terpene resin "CLEARON P150" were melted and kneaded in a 2 L-volume kneader set to 180° C. so that the total amount of raw materials fed was set to 1 kg. After complete melting, 25 parts by weight of a 1-butene homopolymer "PB0800M" was added thereto, followed by kneading for complete melting. Next, 14 parts by weight of a polypropylene-based wax "Viscol 660-P" and 12 parts by weight of liquid polybutene "Nissan Polybutene 30N" were added thereto, followed by kneading for complete melting, and a mold release box was filled with the obtained melted product to obtain a hot-melt adhesive (4).

The hot-melt adhesive (4) was obtained by changing 17 parts by weight of the amount of the propylene/α-olefin copolymer "TAFMER PN-2070" blended in Example 1 to 12 parts by weight, and 20 parts by weight of the amount of the 1-butene homopolymer "PB0800M" blended to 25 parts by weight.

Example 5

0.5 parts by weight of a hindered phenol antioxidant "Irganox 1010", 0.5 parts by weight of a phosphorus-based antioxidant "Irgafos 168", 17 parts by weight of a propylene/α-olefin copolymer "TAFMER PN-2070", and 37 parts by weight of a hydrogenated terpene resin "CLEARON P125" (manufactured by Yasuhara Chemical Co., Ltd., softening point: 125° C.) were melted and kneaded in a 2 L-volume kneader set to 180° C. so that the total amount of raw materials fed was set to 1 kg. After complete melting, 20 parts by weight of a 1-butene homopolymer "PB0800M" was added thereto, followed by kneading for complete melting. Next, 14 parts by weight of a polypropylene-based wax "Viscol 660-P" and 12 parts by weight of liquid polybutene "Nissan Polybutene 30N" were added thereto, followed by kneading for complete melting, and a mold release box was filled with the obtained melted product to obtain a hot-melt adhesive (5).

The hot-melt adhesive (5) was obtained by changing the hydrogenated terpene resin "CLEARON P150" in Example 1 to the hydrogenated terpene resin "CLEARON P125."

Example 6

0.5 parts by weight of a hindered phenol antioxidant "Irganox 1010", 0.5 parts by weight of a phosphorus-based antioxidant "Irgafos 168", 17 parts by weight of a propylene/α-olefin copolymer "TAFMER PN-2070", and 37 parts by weight of a terpene-phenol resin "YS POLYSTAR T145" (manufactured by Yasuhara Chemical Co., Ltd., softening point: 145° C.) were melted and kneaded in a 2 L-volume kneader set to 180° C. so that the total amount of raw materials fed was set to 1 kg. After complete melting, 20 parts by weight of a 1-butene homopolymer "PB0800M" was added thereto, followed by kneading for complete melting. Next, 14 parts by weight of a polypropylene-based wax "Viscol 660-P" and 12 parts by weight of liquid polybutene "Nissan Polybutene 30N" were added thereto, followed by kneading for complete melting, and a mold release box was filled with the obtained melted product to obtain a hot-melt adhesive (6).

The hot-melt adhesive (6) was obtained by changing the hydrogenated terpene resin "CLEARON P150" in Example 1 to the terpene-phenol resin "YS POLYSTAR T145."

Example 7

0.5 parts by weight of a hindered phenol antioxidant "Irganox 1010", 0.5 parts by weight of a phosphorus-based antioxidant "Irgafos 168", 17 parts by weight of a propylene/α-olefin copolymer "TAFMER PN-2070", and 37 parts by weight of a hydrogenated terpene resin "CLEARON P150" were melted and kneaded in a 2 L-volume kneader set to 180° C. so that the total amount of raw materials fed was set to 1 kg. After complete melting, 20 parts by weight of a 1-butene homopolymer "PB0800M" was added thereto, followed by kneading for complete melting. Next, 6 parts by weight of a polypropylene-based wax "Viscol 660-P" and 20 parts by weight of liquid polybutene "Nissan Polybutene 30N" were added thereto, followed by kneading for complete melting, and a mold release box was filled with the obtained melted product to obtain a hot-melt adhesive (7).

The hot-melt adhesive (7) was obtained by changing 14 parts by weight of the amount of the polypropylene-based wax "Viscol 660-P" blended in Example 1 to 6 parts by weight, and 12 parts by weight of the amount of the liquid polybutene "Nissan Polybutene 30N" blended to 20 parts by weight.

Example 8

0.5 parts by weight of a hindered phenol antioxidant "Irganox 1010", 0.5 parts by weight of a phosphorus-based antioxidant "Irgafos 168", 17 parts by weight of a propylene/α-olefin copolymer "TAFMER PN-2070", and 37 parts by weight of a hydrogenated terpene resin "CLEARON P150" were melted and kneaded in a 2 L-volume kneader set to 180° C. so that the total amount of raw materials fed was set to 1 kg. After complete melting, 20 parts by weight of a 1-butene homopolymer "PB0800M" was added thereto, followed by kneading for complete melting. Next, 22 parts by weight of a polypropylene-based wax "Viscol 660-P" and 4 parts by weight of liquid polybutene "Nissan Polybutene 30N" were added thereto, followed by kneading for complete melting, and a mold release box was filled with the obtained melted product to obtain a hot-melt adhesive (8).

The hot-melt adhesive (8) was obtained by changing 14 parts by weight of the amount of the polypropylene-based wax "Viscol 660-P" blended in Example 1 to 22 parts by weight, and 12 parts by weight of the amount of the liquid polybutene "Nissan Polybutene 30N" blended to 4 parts by weight.

Comparative Example 1

0.5 parts by weight of a hindered phenol antioxidant "Irganox 1010", 0.5 parts by weight of a phosphorus-based antioxidant "Irgafos 168", 17 parts by weight of a 1-butene/α-olefin copolymer "TAFMER BL2481M" (manufactured by Mitsui Chemicals, Inc., melting point: 58° C.), and 37 parts by weight of a hydrogenated terpene resin "CLEARON P150" were melted and kneaded in a 2 L-volume kneader set to 180° C. so that the total amount of raw materials fed was set to 1 kg_ After complete melting, 20 parts by weight of a 1-butene homopolymer "PB0800M" was added thereto, followed by kneading for complete melting. Next, 14 parts by weight of a polypropylene-based wax "Viscol 660-P" and 12 parts by weight of liquid polybutene "Nissan Polybutene 30N" were added thereto, followed by kneading for complete melting, and a mold release box was filled with the obtained melted product to obtain a hot-melt adhesive (9).

The hot-melt adhesive (9) was obtained by changing the propylene/α-olefin copolymer "TAFMER PN-2070" in Example 1 to the 1-butene/α-olefin copolymer "TAFMER BL2481M."

Comparative Example 2

0.5 parts by weight of a hindered phenol antioxidant "Irganox 1010", 0.5 parts by weight of a phosphorus-based antioxidant "Irgafos 168", 27 parts by weight of a propylene/α-olefin copolymer "TAFMER PN-2070", and 37 parts by weight of a hydrogenated terpene resin "CLEARON P150" were melted and kneaded in a 2 L-volume kneader set to 180° C. so that the total amount of raw materials fed was set to 1 kg. After complete melting, 10 parts by weight of a 1-butene homopolymer "PB0800M" was added thereto, followed by kneading for complete melting. Next, 14 parts by weight of a polypropylene-based wax "Viscol 660-P" and 12 parts by weight of liquid polybutene "Nissan Polybutene 30N" were added thereto, followed by kneading for complete melting, and a mold release box was filled with the obtained melted product to obtain a hot-melt adhesive (10).

The hot-melt adhesive (10) was obtained by changing 17 parts by weight of the amount of the propylene/α-olefin copolymer "TAFMER PN-2070" blended in Example 1 to 27 parts by weight, and 20 parts by weight of the amount of the 1-butene homopolymer "PB0800M" blended to 10 parts by weight.

Comparative Example 3

0.5 parts by weight of a hindered phenol antioxidant "Irganox 1010", 0.5 parts by weight of a phosphorus-based antioxidant "Irgafos 168", 7 parts by weight of a propylene/α-olefin copolymer "TAFMER PN-2070", and 37 parts by weight of a hydrogenated terpene resin "CLEARON P150" were melted and kneaded in a 2 L-volume kneader set to 180° C. so that the total amount of raw materials fed was set to 1 kg. After complete melting, 30 parts by weight of a 1-butene homopolymer "PB0800M" was added thereto, followed by kneading for complete melting. Next, 14 parts by weight of a polypropylene-based wax "Viscol 660-P" and 12 parts by weight of liquid polybutene "Nissan Polybutene 30N" were added thereto, followed by kneading for complete melting, and a mold release box was filled with the obtained melted product to obtain a hot-melt adhesive (11).

The hot-melt adhesive (11) was obtained by changing 17 parts by weight of the amount of the propylene/α-olefin copolymer "TAFMER PN-2070" blended in Example 1 to 7 parts by weight, and 20 parts by weight of the amount of the 1-butene homopolymer "PB0800M" blended to 30 parts by weight.

Comparative Example 4

0.5 parts by weight of a hindered phenol antioxidant "Irganox 1010", 0.5 parts by weight of a phosphorus-based antioxidant "Irgafos 168", 17 parts by weight of a propyleneα-olefin copolymer "TAFMER PN-2070", and 37 parts by weight of a hydrogenated terpene resin "CLEARON P115" (Yasuhara Chemical Co., Ltd., softening point: 115° C.) were melted and kneaded in a 2 L-volume kneader set to 180° C. so that the total amount of raw materials fed was set to 1 kg. After complete melting, 20 parts by weight of a 1-butene homopolymer "PB0800M" was added thereto, followed by kneading for complete melting. Next, 14 parts by weight of a polypropylene-based wax "Viscol 660-P" and 12 parts by weight of liquid polybutene "Nissan Polybutene 30N" were added thereto, followed by kneading for complete melting, and a mold release box was filled with the obtained melted product to obtain a hot-melt adhesive (12).

The hot-melt adhesive (12) was obtained by changing the hydrogenated terpene resin "CLEARON P150" in Example 1 to the hydrogenated terpene resin "CLEARON P115."

Comparative Example 5

0.5 parts by weight of a hindered phenol antioxidant "Irganox 1010", 0.5 parts by weight of a phosphorus-based antioxidant "Irgafos 168", 17 parts by weight of a propylene/α-olefin copolymer "TAFMER PN-2070", and 37 parts by weight of a hydrogenated terpene resin "CLEARON P150" were melted and kneaded in a 2 L-volume kneader set to 180° C. so that the total amount of raw materials fed was set to 1 kg. After complete melting, 20 parts by weight of a 1-butene homopolymer "PB0800M" was added thereto, followed by kneading for complete melting. Next, 4 parts by weight of a polypropylene-based wax "Viscol 660-P" and 22 parts by weight of liquid polybutene "Nissan Polybutene 30N" were added thereto, followed by kneading for complete melting, and a mold release box was filled with the obtained melted product to obtain a hot-melt adhesive (13).

The hot-melt adhesive (13) was obtained by changing 14 parts by weight of the amount of the polypropylene-based wax "Viscol 660-P" blended in Example 1 to 4 parts by weight, and 12 parts by weight of the amount of the liquid polybutene "Nissan Polybutene 30N" blended to 22 parts by weight.

Comparative Example 6

0.5 parts by weight of a hindered phenol antioxidant "Irganox 1010", 0.5 parts by weight of a phosphorus-based antioxidant "Irgafos 168", 17 parts by weight of a propylene/α-olefin copolymer "TAFMER PN-2070", and 37 parts by weight of a hydrogenated terpene resin "CLEARON P150" were melted and kneaded in a 2 L-volume kneader set to 180° C. so that the total amount of raw materials fed was set to 1 kg. After complete melting, 20 parts by weight of a 1-butene homopolymer "PB0800M" was added thereto, followed by kneading for complete melting. Next, 24 parts by weight of a polypropylene-based wax "Viscol 660-P" and 2 parts by weight of liquid polybutene "Nissan Polybutene 30N" were added thereto, followed by kneading for complete melting, and a mold release box was filled with the obtained melted product to obtain a hot-melt adhesive (14).

The hot-melt adhesive (14) was obtained by changing 14 parts by weight of the amount of the polypropylene-based wax "Viscol 660-P" blended in Example 1 to 24 parts by weight, and 12 parts by weight of the amount of the liquid polybutene "Nissan Polybutene 30N" blended to 2 parts by weight.

[Evaluation]

Test pieces were prepared as follows using the hot-melt adhesive compositions obtained in Examples 1 to 8 and Comparative Examples 1 to 6, and subjected to initial creep measurement, measurement of creep resistant on heating, and peeling strength measurement. The results are shown in Tables 1 and 2.

(1) Test Piece Producing Method

Using a roll coater set to 190° C., 100 g/m² of a hot-melt adhesive was applied (precoated) to a fabric (covering) lined with a polyurethane foam. Then, the fabric was left in an atmosphere of 25° C. for 24 hours. Next, the hot-melt adhesive side was heated by a far-infrared heater, and the fabric was taken out from the far-infrared heater when the surface temperature of the hot-melt adhesive reached 180° C. After the fabric was taken out from the far-infrared heater and left in an atmosphere of 25° C. for 45 seconds, the fabric and a polypropylene molded product ("Kobe Polysheet PP" manufactured by Acous Industry Co., Ltd.) degreased by isopropyl alcohol were pressure-bonded by a pressure bonding method (0.05 MPa, for 10 seconds) to obtain a test piece.

(2) Initial Creep Measurement

After 5 minutes from the preparation of the test piece, a load of 200 g/25 mm in a perpendicular direction was applied to one end of a fabric lined with a polyurethane foam in an atmosphere of 60° C. for 5 minutes to thereby performing a creep test to measure a peeling length.

(3) Measurement of Creep Resistant on Heating

After 2 hours from the preparation of the test piece, a load of 100 g/25 mm in a perpendicular direction was applied to one end of a fabric lined with a polyurethane foam in an atmosphere of 80° C. for 24 hours to thereby perform a creep test to measure a peeling length.

(4) Peeling Strength Measurement

After 2 hours from the preparation of the test piece, 180° peeling strength was measured by a tensile test machine in an atmosphere of 23° C. (tensile speed: 200 mm/min).

TABLE 1

| | Example 1 | Example 2 | Example 3 | Example 4 | Example 5 | Example 6 | Example 7 | Example 8 |
|---|---|---|---|---|---|---|---|---|
| 1-butene homopolymer | 20 | 20 | 15 | 25 | 20 | 20 | 20 | 20 |
| α-olefin copolymer (1) | 17 | | 22 | 12 | 17 | 17 | 17 | 17 |
| α-olefin copolymer (2) | | 17 | | | | | | |
| α-olefin copolymer (3) | | | | | | | | |
| Tackifier resin (1) | | | | | | | | |
| Tackifier resin (2) | | | | | 37 | | | |
| Tackifier resin (3) | 37 | 37 | 37 | 37 | | | 37 | 37 |
| Tackifier resin (4) | | | | | | 37 | | |
| Polypropylene-based wax | 14 | 14 | 14 | 14 | 14 | 14 | 6 | 22 |
| Liquid hydrocarbon | 12 | 12 | 12 | 12 | 12 | 12 | 20 | 4 |
| Antioxidant (1) | 0.5 | 0.5 | 0.5 | 0.5 | 0.5 | 0.5 | 0.5 | 0.5 |
| Antioxidant (2) | 0.5 | 0.5 | 0.5 | 0.5 | 0.5 | 0.5 | 0.5 | 0.5 |
| Total | 101 | 101 | 101 | 101 | 101 | 101 | 101 | 101 |
| Initial creep [mm] | 1 | 1 | 4 | 1 | 4 | 2 | 1 | 8 |
| | A | A | A | A | A | A | A | A |
| Creep resistant on heating [mm] | 4 | 6 | 9 | 10 | 8 | 5 | 6 | 9 |
| | A | A | A | A/C | A/C | A | A | A |
| Peeling strength [N/25 mm] | 5.0 | 4.8 | 5.1 | 4.8 | 5.2 | 4.9 | 5.2 | 5.0 |
| | B | B | B | B | B | B | B | B |

TABLE 2

| | Comparative Example 1 | Comparative Example 2 | Comparative Example 3 | Comparative Example 4 | Comparative Example 5 | Comparative Example 6 |
|---|---|---|---|---|---|---|
| 1-butene homopolymer | 20 | 10 | 30 | 20 | 20 | 20 |
| α-olefin copolymer (1) | | 27 | 7 | 17 | 17 | 17 |
| α-olefin copolymer (2) | | | | | | |
| α-olefin copolymer (3) | 17 | | | | | |

TABLE 2-continued

|  | Comparative Example 1 | Comparative Example 2 | Comparative Example 3 | Comparative Example 4 | Comparative Example 5 | Comparative Example 6 |
|---|---|---|---|---|---|---|
| Tackifier resin (1) |  |  |  |  |  |  |
| Tackifier resin (2) |  |  |  | 37 |  |  |
| Tackifier resin (3) | 37 | 37 | 37 |  | 37 | 37 |
| Tackifier resin (4) |  |  |  |  |  |  |
| Polypropylene-based wax | 14 | 14 | 14 | 14 | 4 | 24 |
| Liquid hydrocarbon | 12 | 12 | 12 | 12 | 22 | 2 |
| Antioxidant (1) | 0.5 | 0.5 | 0.5 | 0.5 | 0.5 | 0.5 |
| Antioxidant (2) | 0.5 | 0.5 | 0.5 | 0.5 | 0.5 | 0.5 |
| Total | 101 | 101 | 101 | 101 | 101 | 101 |
| Initial creep [mm] | 1 A | 33 A | >50 A | 1 A | 17 A | >50 A |
| Creep resistant on heating [mm] | >50 A | >50 A | >50 A | 41 A | 20 A/C | >50 A |
| Peeling strength [N/25 mm] | 5.1 B | 1.9 A | 0.2 A | 4.8 B | 5.1 B | 1.4 A |

Materials described in Tables 1 and 2 are as follows:
1-butene homopolymer: "PB0800M", melting point: 124° C., MFR (190° C., load: 2.16 kg) 200 g/10 min
α-olefin copolymer (1): "TAFMER PN-2070", propylene/α-olefin copolymer, melting point: 140° C.
α-olefin copolymer (2): "TAFMER BL3450M", 1-butene/α-olefin copolymer, melting point: 100° C.
α-olefin copolymer (3): "TAFMER BL2481M", 1-butene/α-olefin copolymer, melting point: 58° C.
Tackifier resin (1): "CLEARON P115", hydrogenated terpene resin, softening point: 115° C.
Tackifier resin (2): "CLEARON P125", hydrogenated terpene resin, softening point: 125° C.
Tackifier resin (3): "CLEARON P150", hydrogenated terpene resin, softening point: 150° C.
Tackifier resin (4): "YS POLYSTAR T145", terpene-phenol resin, softening point: 145° C.
Polypropylene-based wax: "Viscol 660-P", softening point: 145° C.
Liquid hydrocarbon: "Nissan Polybutene 30N", liquid polybutene, kinetic viscosity (100° C.): 670 mm²/s
Antioxidant (1): "Irganox 1010", hindered phenol antioxidant
Antioxidant (2): "Irgafos 168", phosphorus-based antioxidant In the test results in Tables 1 and 2, "A" represents interfacial failure on a PP side; "B" represents material failure of a covering; "C" represents cohesive failure of an adhesive; and when "/" is used, the alphabet on the left side thereof is a main failure state.

Good bonding properties were obtained in the samples of Examples 1 to 8.

Creep resistant properties on heating were decreased in Comparative Example 1 (the melting point of the α-olefin copolymer was lower than 90° C.). In Comparative Example 2 (the content of the 1-butene homopolymer was less than 15 parts by weight, and the content of the α-olefin copolymer was more than 22 parts by weight), bonding properties were decreased in all the items. In Comparative Example 3 (the content of the 1-butene homopolymer is more than 25 parts by weight, and the content of the α-olefin copolymer is less than 12 parts by weight), bonding properties were decreased in all the items. In Comparative Example 4 (the softening point of the tackifier resin was lower than 125° C.), creep resistant properties on heating were decreased. In Comparative Example 5 (the content of the polypropylene-based wax was less than 6 parts by weight, and the content of the liquid hydrocarbon was more than 20 parts by weight), initial creep and creep resistant on heating were decreased. In Comparative Example 6 (the content of the polypropylene-based wax was more than 22 parts by weight, and the content of the liquid hydrocarbon was less than 4 parts by weight), bonding properties were decreased in all the items.

The invention claimed is:
1. An adhesive composition comprising:
  15 to 25 parts by weight of a 1-butene homopolymer;
  12 to 22 parts by weight of an α-olefin copolymer having a melting point of 90° C. or higher;
  30 to 50 parts by weight of a tackifier resin having a softening point of 125° C. or higher;
  6 to 22 parts by weight of a polypropylene-based wax; and
  4 to 20 parts by weight of a liquid hydrocarbon.
2. The adhesive composition according to claim 1, wherein the α-olefin copolymer is a 1-butene/α-olefin copolymer or a propylene/α-olefin copolymer.
3. The adhesive composition according to claim 1, wherein the tackifier resin is at least one selected from a terpene-phenol resin and a hydrogenated resin.
4. The adhesive composition according to claim 1, wherein a peeling length is 10 mm or less when performing a test for creep resistant on heating under the condition of a load of 100 g for 24 hours in an atmosphere of 80° C. after bonding adherends via the adhesive composition with an open time of 45 seconds.
5. The adhesive composition according to claim 2, wherein the tackifier resin is at least one selected from a terpene-phenol resin and a hydrogenated resin.
6. The adhesive composition according to claim 2, wherein a peeling length is 10 mm or less when performing a test for creep resistant on heating under the condition of a load of 100 g for 24 hours in an atmosphere of 80° C. after bonding adherends via the adhesive composition with an open time of 45 seconds.
7. The adhesive composition according to claim 3, wherein a peeling length is 10 mm or less when performing a test for creep resistant on heating under the condition of a load of 100 g for 24 hours in an atmosphere of 80° C. after bonding adherends via the adhesive composition with an open time of 45 seconds.
8. The adhesive composition according to claim 5, wherein a peeling length is 10 mm or less when performing a test for creep resistant on heating under the condition of a load of 100 g for 24 hours in an atmosphere of 80° C. after bonding adherends via the adhesive composition with an open time of 45 seconds.

\* \* \* \* \*